United States Patent
Graf et al.

(10) Patent No.: US 9,599,538 B2
(45) Date of Patent: Mar. 21, 2017

(54) METHOD AND DEVICE FOR VEHICLE MEASUREMENT

(71) Applicant: Robert Bosch GmbH, Stuttgart (DE)

(72) Inventors: Simone Graf, Munich (DE); Christian Wagmann, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/762,625

(22) PCT Filed: Dec. 9, 2013

(86) PCT No.: PCT/EP2013/075897
§ 371 (c)(1),
(2) Date: Jul. 22, 2015

(87) PCT Pub. No.: WO2014/114402
PCT Pub. Date: Jul. 31, 2014

(65) Prior Publication Data
US 2015/0369701 A1    Dec. 24, 2015

(30) Foreign Application Priority Data

Jan. 22, 2013    (DE) .................... 10 2013 200 910

(51) Int. Cl.
*G01M 17/007*    (2006.01)
*G06T 7/00*    (2006.01)
*G01B 11/16*    (2006.01)

(52) U.S. Cl.
CPC .......... *G01M 17/007* (2013.01); *G01B 11/16* (2013.01); *G01B 11/168* (2013.01); *G06T 7/001* (2013.01); *G06T 7/0046* (2013.01); *G01B 2210/286* (2013.01); *G06T 2207/10012* (2013.01); *G06T 2207/30108* (2013.01); *G06T 2207/30252* (2013.01)

(58) Field of Classification Search
CPC   G01B 11/16; G01B 11/168; G01B 2210/286; G01M 17/007; G06T 7/0046; G06T 7/001; G06T 2207/30252; G06T 2207/10012; G06T 2207/30108
USPC ....................................... 382/104
See application file for complete search history.

(56) References Cited

U.S. PATENT DOCUMENTS

| 4,724,704 A | 2/1988 | Alain |
| 5,962,779 A * | 10/1999 | Bass ..................... G01L 17/005 73/146.2 |
| 2005/0068522 A1* | 3/2005 | Dorrance ........... G01B 11/2755 356/139.09 |

(Continued)

FOREIGN PATENT DOCUMENTS

| DE | 10 2006 048725 | 4/2008 |
| JP | 2011 027509 | 2/2011 |
| WO | WO 01/23834 | 4/2001 |

*Primary Examiner* — Jon Chang
(74) *Attorney, Agent, or Firm* — Gerard Messina

(57) ABSTRACT

A method for checking the correct positioning of a vehicle on a measuring station for vehicle measurement includes: a) taking images of at least two tires of the vehicle; b) identifying features, in the images taken, which describe at least one area of the respectively recorded tire; c) fitting a mathematical model to the identified features; d) determining the extent of the flattening of each tire from the fitted mathematical model; e) comparing the flattening of the at least two tires.

17 Claims, 2 Drawing Sheets

(56) References Cited

U.S. PATENT DOCUMENTS

2006/0126966 A1 6/2006 Strege et al.
2014/0288859 A1* 9/2014 Wittmann ............ G01L 17/005
702/55

* cited by examiner

METHOD AND DEVICE FOR VEHICLE MEASUREMENT

FIELD OF THE INVENTION

The present invention relates to a method and a device for checking the correct positioning of a vehicle on a measuring station for vehicle measurement.

BACKGROUND INFORMATION

In vehicle measurement, the flatness of the measuring station and an exactly horizontal alignment of the vehicle are very important in order to achieve accurate results during the measurement. For example, the manufacturers specify that the maximum difference in elevation between the wheel contact surfaces may not amount to more than 1 mm.

In addition, equal air pressures are required, at least in the wheels of one axle, in order to avoid an inclination of the body based on a different compression of the tires.

In order to obtain correct measuring results, it is therefore required to check both the flatness and the horizontal orientation of the measuring station, as well as the air pressure in the wheels of the vehicle to be measured before every measurement.

This checking takes up much time, so that there is a danger that the necessary verifications are dispensed with due to laziness, and, as a result, the vehicle measurement is carried out erroneously.

SUMMARY OF THE INVENTION

It is therefore an object of the present invention to simplify and as much as possible to automate carrying out the necessary verifications.

A method according to the present invention for checking the correct positioning of a vehicle on a measuring station for vehicle measurement, particularly for checking a correct horizontal orientation of the vehicle, includes the steps of taking images of at least two tires of the vehicle; of identifying features in the images taken which describe at least one area of the respectively recorded tire; of fitting a mathematical model to the identified features of the tire; of determining the extent of the flattening of each tire from the fitted mathematical model; and of comparing the flattening of the at least two tires.

The identified features describe particularly that area of the tire in which a flattening takes place, that is, in particular an area situated around the tire contact area of the tire.

A device according to the present invention for checking the correct positioning of a vehicle on a measuring station for vehicle measurement, especially for checking a correct horizontal orientation of the vehicle, having at least two sensing devices, which are each configured to take images of a tire of the vehicle, has an evaluation device that is configured to identify features in the images taken, which describe at least one area of the respectively recorded tire; a mathematical model to fit to the identified features; to determine the extent of the flattening of each tire from the fitted mathematical model; and to compare to one another the flattening of at least two tires.

Using a device according to the present invention and a method according to the present invention, one is able to check the proper horizontal orientation of the motor vehicle to be measured in a simple and convenient manner and particularly in automated fashion. In particular, a checking according to the present invention may be set up by a software update of an existing measuring device, without having to install additional hardware. The checking according to the present invention may therefore be implemented cost-effectively both in new and in already existing measuring stations.

In particular, the evaluation device may be integrated into one of the sensing devices, which are used for the vehicle measurement.

The device may have four or more sensing devices, in order to be able to record all the wheels of the vehicle simultaneously.

The method may additionally have the step of emitting a warning and/or blocking a planned vehicle measurement, if the difference in the flattening of the tires exceeds a specified boundary value.

Each tire or at least a subsection of the tire may be illuminated respectively by a projector, which may be configured as a light projector or a laser projector, in order to enable a structured image-recording of the tire or a subsection thereof.

The images of the tires may be taken using a stereo camera as stereo images, in order to be able to take into account also three-dimensional information.

The mathematical model, that is fitted to the images taken, may particularly be a two or three-dimensional mathematical model, for instance, a rotationally symmetrical polynomial model or a spline model. Such models have proven particularly suitable for producing a sufficiently accurate mathematical model of the tires, at a justifiable computing expenditure.

The method may additionally include taking a plurality of images of each wheel when the vehicle is passing; determining the turning centers of the wheels from the mathematical model; and checking whether the wheels moved in one plane when the vehicle was passing.

In this way, inclined positions of the vehicle, which come about from different air pressures in the tires, and also unevennesses of the measuring station may reliably be detected, so that a manual checking of the measuring station is no longer required.

If the sensing device is equipped with a gravity sensor, which makes it possible to determine the orientation of the sensing device in the gravity field of the Earth, then, in addition, the orientation of the plane of the measuring station in the gravity field of the Earth may also be determined.

In the following text, the present invention will be explained in greater detail with reference to the appended figures.

DETAILED DESCRIPTION

Figure 1:
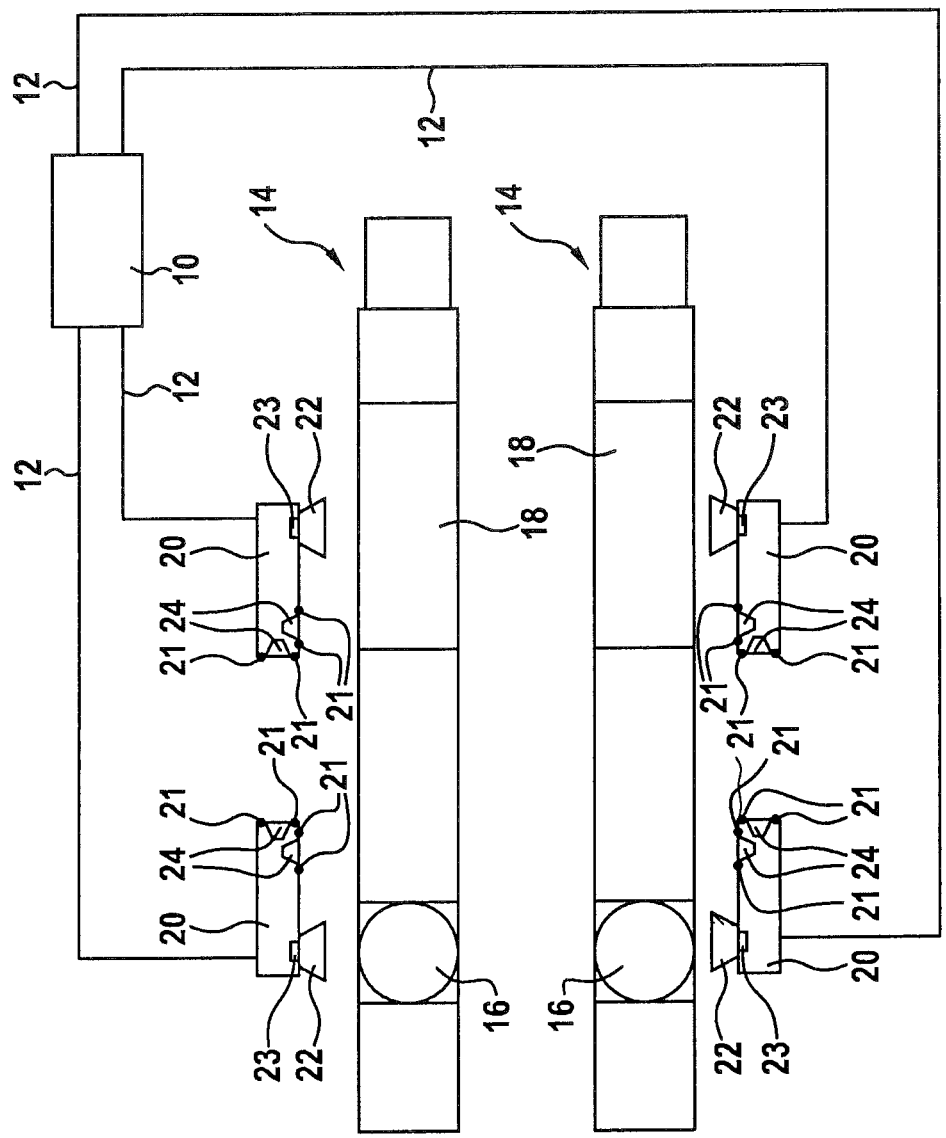
FIG. 1 shows a schematic top view of a measuring station for vehicle measurement.

FIG. 1 shows a schematic top view of a measuring station for vehicle measurement.

The measuring station shows two rails 14 arranged in parallel to each other, which may be rails 14 of a car lift. Rails 14 may also be installed in a fixed manner on the floor of the measuring station, however. Alternatively, the method may also be carried out without rails 14 on the floor of the measuring station.

In an area shown on the left in FIG. 1, each of the two rails 14 is equipped with a turntable 16, which makes it possible to turn in the steerable wheels of a vehicle situated on rails 14, when the vehicle is situated on the rails 14 in such a way that its steerable wheels are supported on turntables 16.

In an area shown on the right-hand side in FIG. 1, rails 14 each have a sliding plate 18. Sliding plates 18 are slidable parallel to the longitudinal extension of rails 14, and may thus be situated at a variable distance from associated turntable 16. In this way, the measuring station is able to be adapted to various vehicles that have different distances between the front wheels and the rear wheels.

In a rectangular set-up, four sensing devices 20 are situated about rails 14. Two (front) sensing devices 20 are situated level with turntables 16, and thus situated next to the usually steerable front wheels of a vehicle parked on rails 14. Two (rear) sensing devices 20 are able to be moved along rails 14, so that their position is able to be adapted in such a way to the wheelbase of the vehicle to be measured that rear sensing devices 20 are always positioned opposite the rear wheels of the vehicle parked on rails 14.

Each of sensing devices 20 has an image-taking device (image sensor) 22 for recording measured values, which is configured as a (stereo) camera, for instance, and an integrated illuminating device 23, which is configured to illuminate the wheel to be measured that lies opposite respective sensing device 20.

Each of sensing devices 20 may also have position lights 21 and an optical sensor 24 each, in order to be able to determine the position of the respective sensing device 20 with reference to at least two others of sensing devices 20.

Sensing devices 20 are connected via data lines 12 to a central evaluation device 10. Alternatively, sensing devices 20 may be connected in a wireless manner to central evaluation device 10. Evaluation device 10 may also be situated in one or more of sensing devices 20.

Figure 2:
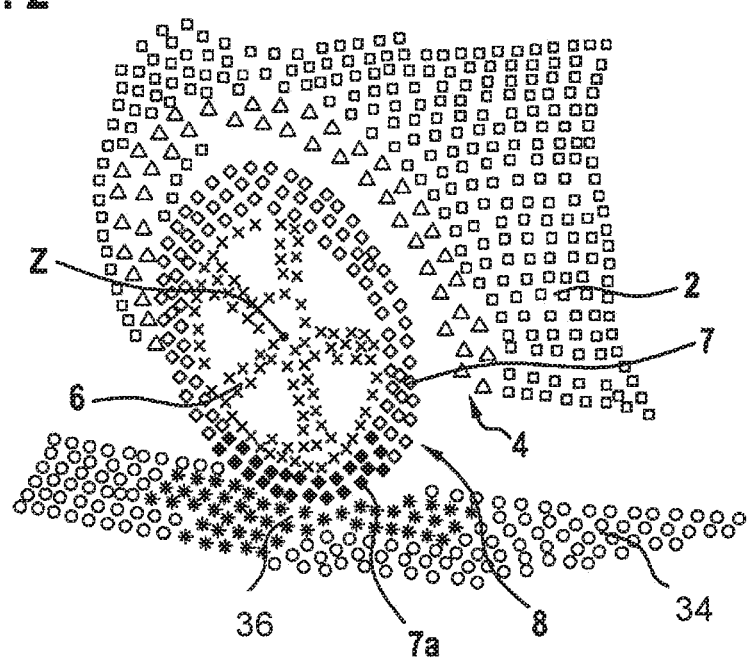
FIG. 2 shows an example of a 3D-point cloud, taken by a sensing device situated next to the left front wheel of a motor vehicle.

FIG. 2 shows an example of a 3D-point cloud, as it is recorded by a sensing device 20, which is situated at left front wheel 8 of a vehicle.

The appertaining of the recorded points to wheel 8, to the car's body 2, for instance, wheelhouse 4 and to roadway 34, 36 is determined by the combination of intelligent image-processing algorithms. From the points assigned to tire 7 of wheel 8, those particular points 7a are identified which belong to the lower region of tire 7 which is flattened based on the curb weight of the vehicle.

A mathematical model, particularly a so-called spline model, is fitted to the points representing tire 7, and in particular to points 7a of the lower, flattened region of tire 7. The flattening of tire 7 may then be determined from the parameters of the mathematical model.

This process is carried out for at least two tires 7 of the vehicle, and the flattening incidences of tire 7 are compared to one another. If the differences of the extent of the flattenings between different tires 7 of a vehicle exceed a specified boundary value, a warning signal is emitted and/or a planned vehicle measurement is prevented, since upon the exceeding of the boundary value, the vehicle measurement is no longer able to be carried out at the accuracy required, but would lead to false results.

In one broadened specific embodiment, one or more images are taken of each wheel 8, while the vehicle travels onto, or over the measuring station. From the at least one image taken, one may additionally determine the turning center Z of each wheel 8. A method suitable for this is described in DE 10 2006 048 725 A1 for example.

In the following it may be established whether the turning centers Z of wheels 8 move in one plane during its travel onto the measuring station, i.e. whether the plane of the measuring station is really flat. In this case, too, a warning is emitted and/or the measurement is terminated if the unevenness of the measuring station exceeds a specified limit, so that an error-free measurement is no longer possible.

Consequently, the present invention makes it possible conveniently and reliably to check the prerequisites for a successful vehicle measurement, particularly a horizontal orientation of the vehicle body.

What is claimed is:

1. A method for checking a correct positioning of a vehicle on a measuring station for vehicle measurement, the method comprising:
   taking images of at least two tires of the vehicle;
   identifying features in the images taken, which describe at least one area of the respectively recorded tire;
   fitting a mathematical model to the identified features;
   determining the extent of the flattening of each tire from the fitted mathematical model;
   comparing the flattening of the at least two tires;
   taking at least one image of each tire of the vehicle while the vehicle is passing by;
   determining turning centers of the wheels from the mathematical model; and
   checking whether the turning centers of the wheels have moved in one plane while the vehicle was passing by.

2. The method of claim 1, further comprising:
   emitting a warning and/or blocking a planned vehicle measurement, if the difference in the flattening of the tires exceeds a specified boundary value.

3. The method of claim 1, wherein the tires are each illuminated by a projector.

4. The method of claim 1, wherein stereo images of the tires are taken using a stereo camera.

5. The method of claim 1, wherein the mathematical model is a two-dimensional model or a three-dimensional mathematical model.

6. A device for checking a correct positioning of a vehicle on a measuring station for the vehicle measurement, using at least two sensing devices, which are each configured to take images of a tire of the vehicle, comprising:
   an evaluation device configured to perform the following:
      identify features in the images taken, which describe at least one area of the respectively recorded tire;
      fit a mathematical model to the identified features;
      determine the extent of the flattening of each tire from the fitted mathematical model; and
      compare the flattening of at least two tires to one another;
   taking at least one image of each tire of the vehicle while the vehicle is passing by;
   determining turning centers of the wheels from the mathematical model; and
   checking whether the turning centers of the wheels have moved in one plane while the vehicle was passing by.

7. The device of claim 6, wherein the evaluation device is integrated into at least one of the sensing devices.

8. The device of claim 6, wherein the device has four sensing devices.

9. The device of claim 6, further comprising:
   an emitting arrangement to emit a warning and/or blocking a planned vehicle measurement, if the difference in the flattening of the tires exceeds a specified boundary value.

10. The device of claim 6, wherein the tires are each illuminated by a projector.

11. The device of claim 6, wherein stereo images of the tires are taken using a stereo camera.

12. The device of claim 6, wherein the mathematical model is a two-dimensional model or a three-dimensional mathematical model.

13. A device for vehicle measurement, comprising:
- an arrangement for checking a correct positioning of a vehicle on a measuring station for the vehicle measurement, using at least two sensing devices, which are each configured to take images of a tire of the vehicle, the arrangement including an evaluation device configured to perform the following:
  - identify features in the images taken, which describe at least one area of the respectively recorded tire;
  - fit a mathematical model to the identified features;
  - determine the extent of the flattening of each tire from the fitted mathematical model; and
  - compare the flattening of at least two tires to one another;
  - taking at least one image of each tire of the vehicle while the vehicle is passing by;
  - determining turning centers of the wheels from the mathematical model; and
  - checking whether the turning centers of the wheels have moved in one plane while the vehicle was passing by.

14. The device of claim 13, further comprising:
- an emitting arrangement to emit a warning and/or blocking a planned vehicle measurement, if the difference in the flattening of the tires exceeds a specified boundary value.

15. The device of claim 13, wherein the tires are each illuminated by a projector.

16. The device of claim 13, wherein stereo images of the tires are taken using a stereo camera.

17. The device of claim 13, wherein the mathematical model is a two-dimensional model or a three-dimensional mathematical model.

* * * * *